United States Patent [19]

Deguchi

[11] Patent Number: 5,716,730
[45] Date of Patent: Feb. 10, 1998

[54] BATTERY CASE MOUNTING STRUCTURE FOR ELECTRONIC EQUIPMENT

[75] Inventor: Manabu Deguchi, Tokyo, Japan

[73] Assignee: NEC Corporation, Tokyo, Japan

[21] Appl. No.: 671,168

[22] Filed: Jun. 26, 1996

[30] Foreign Application Priority Data

Jun. 30, 1995  [JP]  Japan .................... 7-188588

[51] Int. Cl.$^6$ .................... H01M 2/10
[52] U.S. Cl. .................... 429/97; 429/123
[58] Field of Search .................... 429/97, 123

[56] References Cited

U.S. PATENT DOCUMENTS

| | | | |
|---|---|---|---|
| 4,085,253 | 4/1978 | Johnson | 429/1 |
| 5,208,116 | 5/1993 | Joh | 429/123 X |
| 5,248,569 | 9/1993 | Pine et al. | 429/97 |
| 5,294,496 | 3/1994 | Sato | 429/123 X |
| 5,317,247 | 5/1994 | Crong et al. | 320/2 |
| 5,535,437 | 7/1996 | Karl et al. | 429/97 X |

FOREIGN PATENT DOCUMENTS

| | | |
|---|---|---|
| 1-146455 | 10/1989 | Japan . |
| 3-84992 | 8/1991 | Japan . |
| 5-72054 | 9/1993 | Japan . |

Primary Examiner—Stephen Kalafut
Attorney, Agent, or Firm—Ostrolenk, Faber, Gerb & Soffen, LLP

[57] ABSTRACT

In a battery case mounting structure for electronic equipment, a battery case has a battery for supplying power to an electronic equipment. The electronic equipment has a main body provided with a mounting portion on which the battery case is to be mounted. A recessed portion is formed in the battery case. A locking projecting body is formed on the main body of the electronic equipment and inserted in the recessed portion to fix the battery case to the mounting portion. A guide portion supports the locking projecting body to be projectable from or retractable into the recessed portion so that the battery case is attachable to or detachable from the main body. A spring mechanism constantly biases the locking projecting body to project. An operating portion slides the locking projecting body to retract against a biasing force of the spring mechanism. Two terminals formed in the recessed portion are electrically connected to electrodes of the battery. Two different terminals formed on the locking projecting body come into electrical contact with the terminals formed in the battery case respectively and are electrically connected to an operating circuit of the electronic equipment when the locking projecting body is inserted in the recessed portion of the battery case.

6 Claims, 10 Drawing Sheets

BATTERY CASE MOUNTING STRUCTURE FOR ELECTRONIC EQUIPMENT

BACKGROUND OF THE INVENTION

1. Field of the Invention

The present invention relates to the structure for electronic equipment that can be operated by a battery and, more particularly, to the mounting structure and power feed structure of the battery case for electronic equipment.

2. Description of the Prior Art

Electronic equipment which are driven by a dry cell or a rechargeable secondary cell (to be generally referred to as a battery hereinafter) include many products, e.g., a portable cellular phone set, a laptop computer set (notebook personal computer set), a small cassette tape recorder set, and a small CD player set. Some of these products are used by detachably mounting a battery pack incorporating a battery or a cell pack (to be generally referred to as a battery case hereinafter) to the main body and exchanging it as required.

Figure 1:
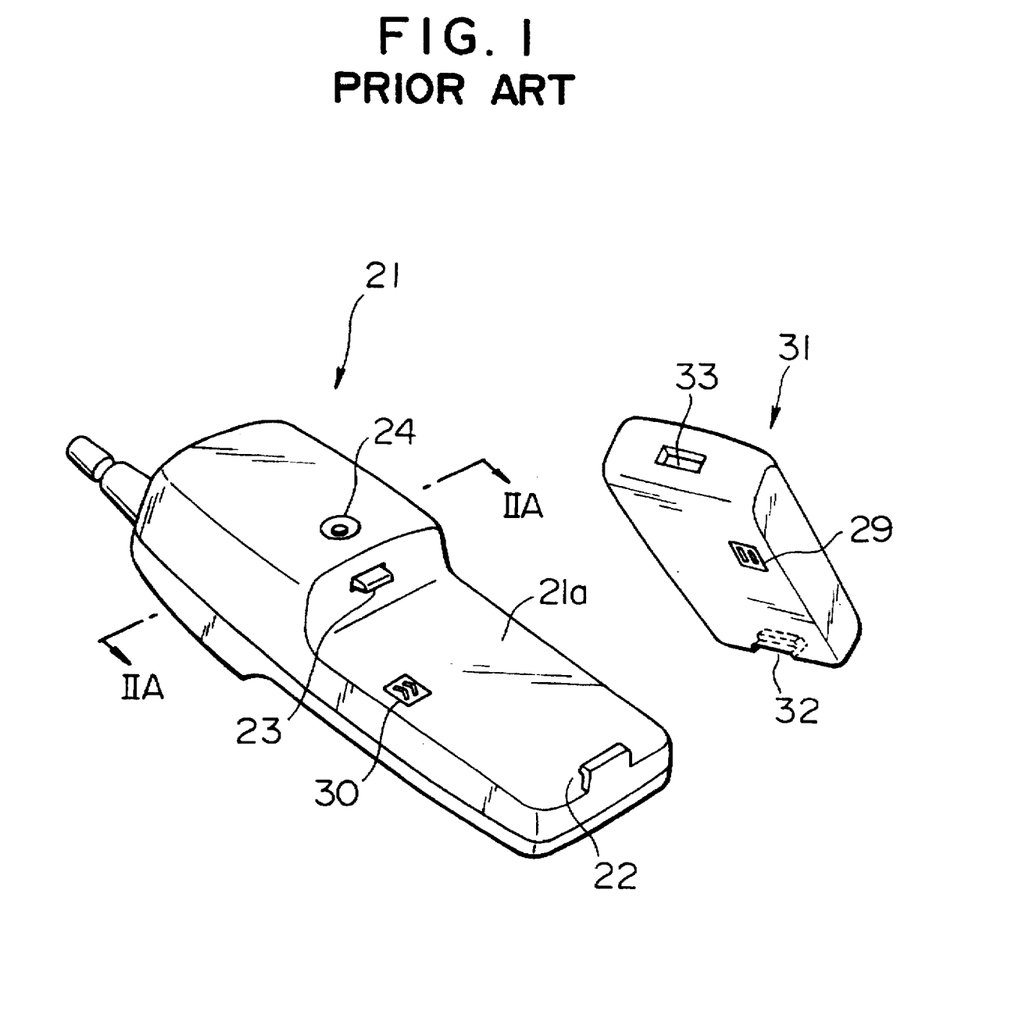
FIG. 1 is a perspective view showing a state in a conventional example wherein the electronic equipment is a portable cellular phone set and a battery case is removed from a telephone body.
Figure 2A:
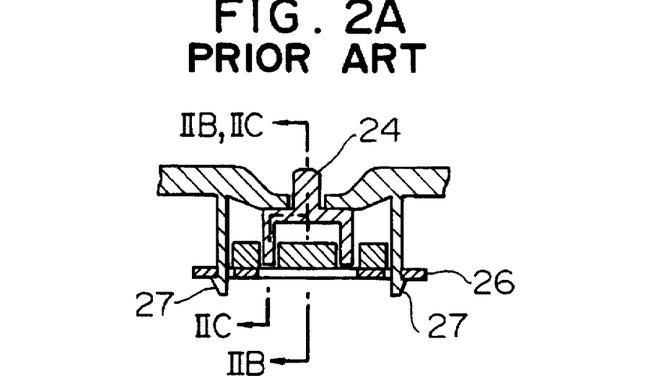
FIG. 2A is a partial sectional view of a vertical plane taken along the line IIA—IIA of FIG. 1.
Figure 2B:
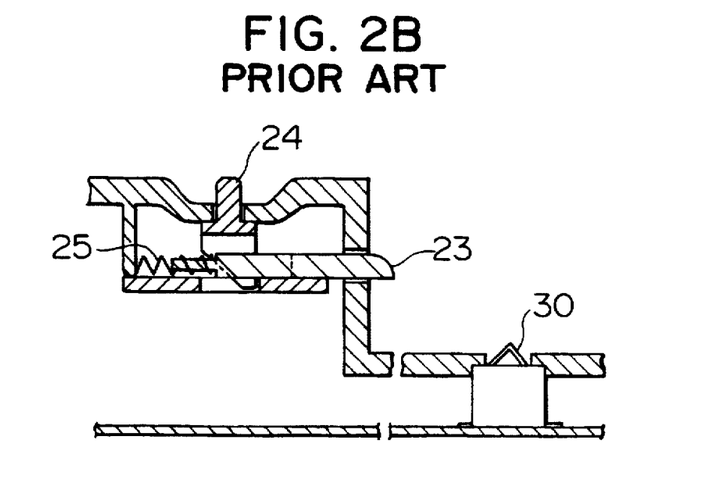
FIG. 2B is a partial sectional view taken along the line IIB—IIB of FIG. 2A.
Figure 2C:
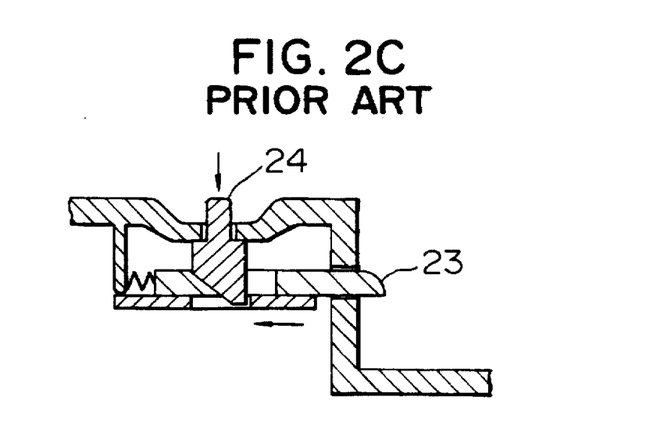
FIG. 2C is a partial sectional view taken along the line IIC—IIC of FIG. 2A.

FIGS. 1 to 2C show an example of the mounting structure of a portable cellular phone set as the mounting structure of a conventional battery case for such an electronic equipment.

As shown in FIG. 1, in the mounting structure of the conventional battery case, a battery case 31 has a locking groove 32 and a locking recessed portion 33, and a portable cellular phone body (hereinafter calls "telephone body") 21 has a locking segment 22 and a retractable locking projecting body 23 in its battery mounting portion 21a to engage with the locking groove 32 and the locking recessed portion 33, respectively. By the engagement of the locking groove 32 and the locking recessed portion 33 with the locking segment 22 and the locking projecting body 23, respectively, the battery case 31 is fixed to the telephone body 21. The locking projecting body 23 is normally biased by a spring 25 to project, as shown in FIGS. 2A to 2C. When a release button 24 is depressed, the locking projecting body 23 slides in the retracting direction to disengage from the locking recessed portion 33 (see the arrows in FIG. 2C).

In the mounting structure of the conventional battery case, to enable power supply by the battery, terminals 29 connected to the electrodes of the internal battery is provided on the lower surface of the battery case 31 and a connector 30 connected to the internal circuit of the telephone is provided at a position on the battery mounting portion 21a of the portable telephone body 21 which corresponds to the terminals 29. When the battery case 31 is mounted on the telephone body 21, the terminals 29 and the connector 30 come into contact with each other to supply power from the battery.

In this mounting structure of the conventional battery case, however, two types of components, i.e., one for fixing the battery case and the other one for supplying power from the battery case, must be mounted separately to interfere with downsizing of the electronic equipment. Also, this increases the number of components and the number of assembling steps to increase the cost.

Japanese Unexamined Utility Model Publication No. 3-84992 shows the fixing structure of the battery of a small cassette tape player, and Japanese Unexamined Utility Model Publication Nos. 5-72054 and 1-146455 show terminal structures for supplying power from batteries. When such a structure is to be practiced in a product, a component for fixing the battery case and a component for supplying power from the battery case are required separately.

SUMMARY OF THE INVENTION

The present invention has been made in view of the above situation of the conventional technique, and has as its object to make the structure for fixing the battery case and the structure for supplying power from the battery into one common structure so that the number of components and the number of component assembling steps are reduced, thereby reducing the size and cost of the electronic equipment.

In order to achieve the above object, according to the first aspect of the present invention, there is provided a battery case mounting structure comprising: a battery case having a battery for supplying power to electronic equipment; the electronic equipment having a main body provided with a mounting portion on which the battery case is to be mounted; a recessed portion formed in the battery case; a locking projecting body formed on the main body of the electronic equipment and inserted in the recessed portion of the battery case to fix the battery case to the mounting portion; a guide portion for supporting the locking projecting body to be projectable from or retractable into the recessed portion so that the battery case is attachable to or detachable from the main body of the electronic equipment; a spring for constantly biasing the locking projecting body to project; an operating portion for sliding the locking projecting body to retract against a biasing force of the spring; two terminals formed in the recessed portion of the battery case to be electrically connected to electrodes of the battery; and two terminals formed on the locking projecting body to come into electrical contact with the terminals formed on the battery case respectively and to be electrically connected to an operating circuit of the electronic equipment when the locking projecting body is inserted in the recessed portion of the battery case.

According to another aspect of the present invention, a recessed portion is formed in the main body of the electronic equipment in place of forming it in the battery case, and a locking projecting body is formed on the battery case in place of forming it on the main body of the electronic equipment.

The two terminals formed in the recessed portion may form flat plates provided side by side on a bottom portion of the recessed portion, and the two terminals of the locking projecting body may be obtained by forming the distal end portion of the locking projecting body into two projecting conductive pins.

In the present invention, the main body of the electronic equipment may have an engaging segment or an engaging groove, the battery case may have an engaging groove or an engaging segment that engages with the engaging segment or engaging groove of the main body of the electronic equipment, and the battery case may be fixed to the mounting portion of the main body of the electronic equipment through engagement of the engaging segment and engaging groove and engagement of the locking projecting body and the recessed portion.

In the arrangements of the above aspects, when mounting the battery case on the battery mounting portion of the main body of the electronic equipment, the operating portion is operated to slide the locking projecting body to retract from the mounting portion. In this case, the battery case is mounted on the mounting portion, and the operating portion is released. The distal end of the locking projecting body is inserted in the recessed portion of the battery case by the force of the spring, thereby fixing the battery case. In this state, the electrode portions formed on the locking projecting body are in contact with the terminals formed in the recessed portion to enable power supply simultaneously.

Therefore, with the battery case mounting structure of the present invention, a required mounting space can be reduced to contribute to downsizing of the electronic equipment. Moreover, since the locking members also serve as power supply terminals, the number of components and the number of assembling steps can be reduced, thereby decreasing the cost.

Since one pair of terminals are located in the recessed portion, they cannot be easily accessed by the operator. Then, nonconductive materials, e.g., oil films or duct, will not easily attach to the terminals, so that the terminals can maintain good contact properties.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIGS. 2A to 2C are sectional views of the main part of the conventional example shown in FIG. 1, in which

FIGS. 5A to 5C are sectional views of the main part of the first embodiment, in which

FIGS. 9A and 9B show the second embodiment shown in FIG. 8, in which

FIGS. 13A and 13B show a battery case according to the third embodiment of the present invention, in which

DETAILED DESCRIPTION OF PREFERRED EMBODIMENTS

Several preferred embodiments of the present invention will be described in detail with reference to the accompanying drawings.

Figure 3:
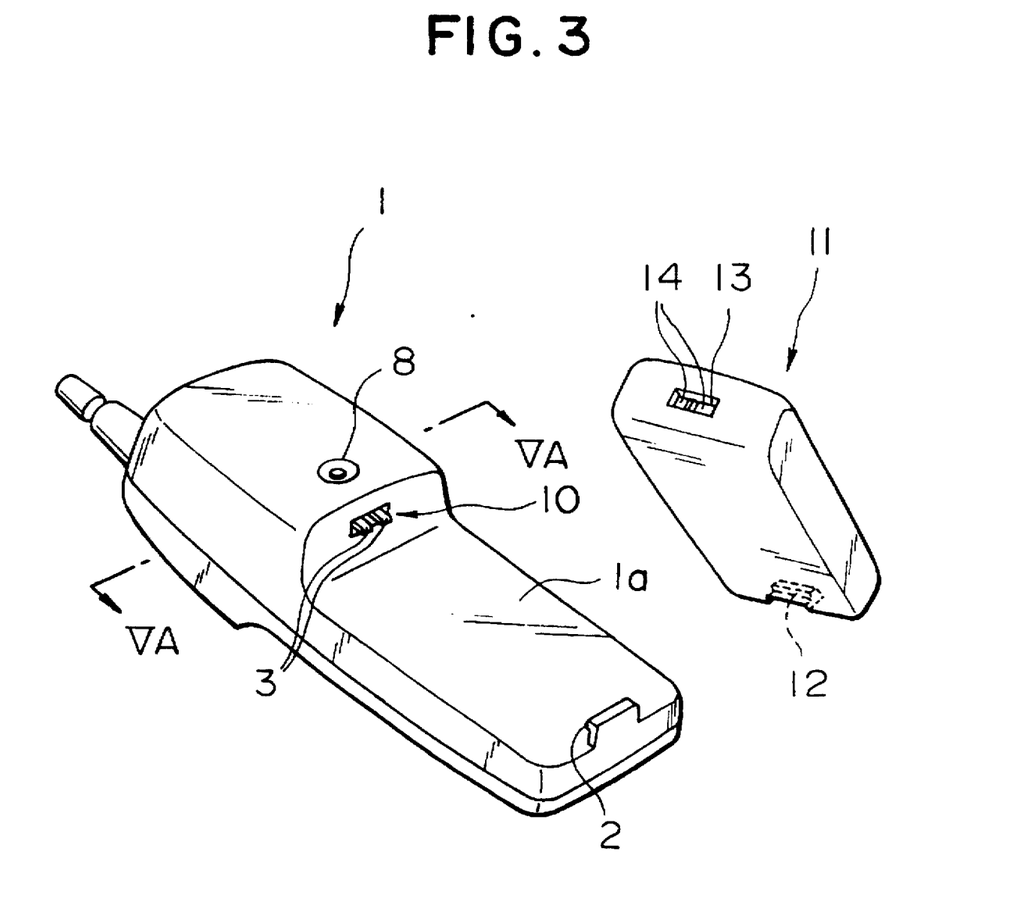
FIG. 3 is a perspective view showing a state of the first embodiment of the present invention wherein the electronic equipment is a portable cellular phone set and a battery case is removed from the telephone body.

FIGS. 3 to 7 show an example in which the mounting structure of the battery case of the present invention is applied to a portable cellular phone set, in which FIG. 3 is a perspective view of this case in which a battery case 11 is removed from a portable cellular phone body (hereinafter calls telephone body) 1.

Referring to FIG. 3, a mounting portion 1a for mounting the substantially rectangular battery case 11 is formed on the lower half portion of the rear surface of the telephone body 1. When the battery case 11 is exchangeably mounted on the mounting portion 1a, the portable cellular phone set can be used continuously by supplying power from the battery.

The battery case 11 incorporates a battery constituted by a secondary cell made of nickel-cadmium, nickel-hydrogen, or the like in it, and has a recessed portion 13 in its upper side surface and a locking groove 12 in its lower side surface. Two terminal plates 14 electrically isolated from each other are provided on the bottom surface of the recessed portion 13. The terminal plates 14 are respectively connected to the electrodes of the battery incorporated in the battery case 11 to allow power supply to the outside.

The locking groove 12 is a groove formed by removing the central portion of the lower side surface of the battery case 11 from the mounting surface side into a substantially L shape. When the battery case 11 is mounted on the telephone body 1, the locking groove 12 engages with a locking segment 2 to be described later.

The locking segment 2 is formed integrally with the telephone body 1 on the lower end portion of the mounting portion 1a to rise upright from the mounting surface. A lock mechanism 10 for fixing the battery case 11 on the mounting portion 1a is provided at the upper portion of the mounting portion 1a.

Figure 4:
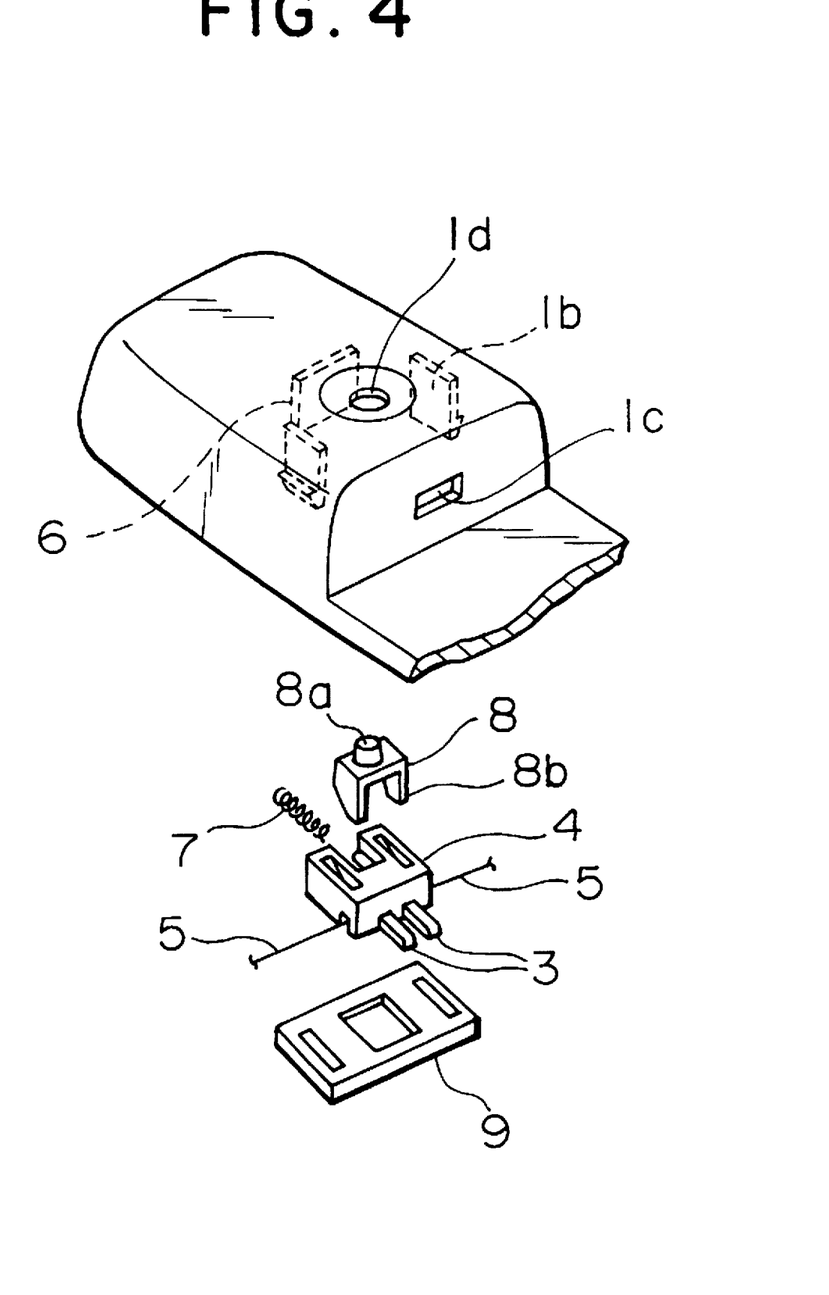
FIG. 4 is an exploded perspective view of a lock mechanism of the first embodiment.
Figure 5A:
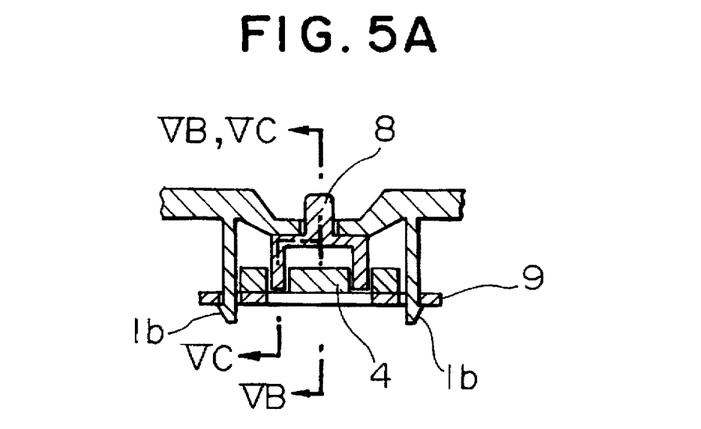
FIG. 5A is a partial sectional view of a vertical plane taken along the line VA—VA of FIG. 3.
Figure 5B:
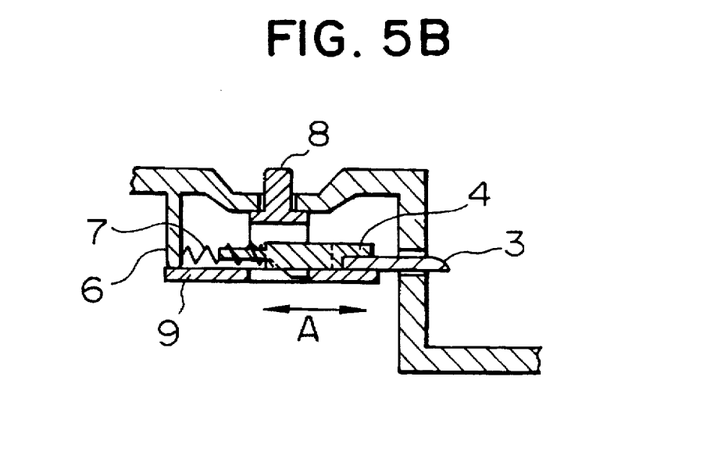
FIG. 5B is a partial sectional view taken along the line VB—VB of FIG. 5A.
Figure 5C:
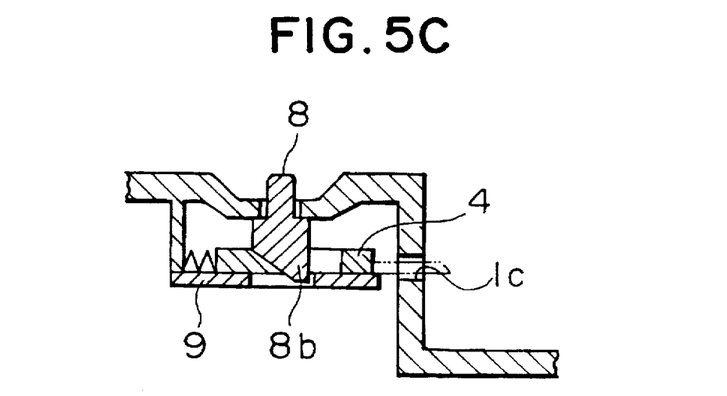
FIG. 5C is a partial sectional view taken along the line VC—VC of FIG. 5A.

FIGS. 4 to 5C show the structure of the lock mechanism 10, in which FIG. 4 is an exploded perspective view of the lock mechanism, FIG. 5A is a sectional view of a vertical plane taken along the line VA—VA of FIG. 3, FIG. 5B is a sectional view taken along the line VB—VB of FIG. 5A, and FIG. 5C is a sectional view taken along the line VC—VC of FIG. 5A.

The lock mechanism 10 causes a slider 4 provided in the telephone body 1 and having two conductive pins 3 at its distal end to project from or retract into the wall surface of the mounting portion 1a. As shown in FIGS. 4 to 5C, the slider 4 is placed on a guide plate 9 hung in the telephone body 1 from locking hooks 1b and is slidable within a space surrounded by the locking hooks 1b and the guide plate 9 only in directions of a double-headed arrows A in FIG. 5B.

The slider 4 is made of a nonconductive material, e.g., a plastic, and has the two conductive pins 3 that are electrically isolated from each other and parallel to each other at its distal end portion. The distal end portions of the conductive pins 3 face the mounting portion 1a through a slit 1c of the telephone body 1. As the slider 4 slides, the distal end portions of the conductive pins 3 project or retract through the slit 1c.

A spring 7 having one end attached to a rib 6 of the telephone body 1 is provided to the rear end portion of the slider 4. The spring 7 constantly biases the slider 4 forward (toward the slit 1c) to project the conductive pins 3 through the slit 1c.

Figure 7:
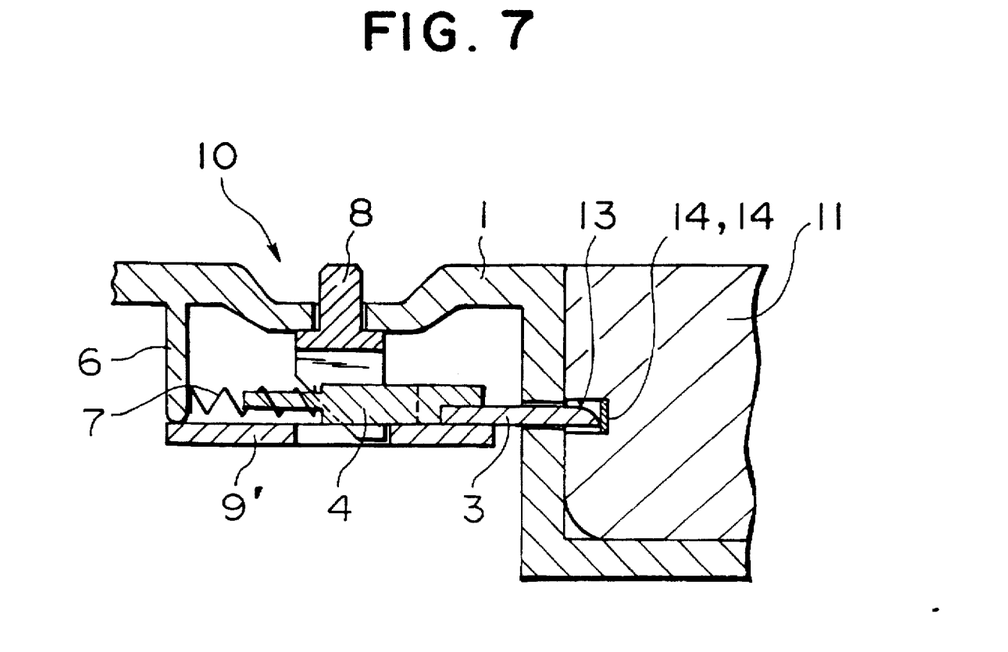
FIG. 7 is an enlarged sectional view of one side of the main part shown in FIG. 6.

The projecting position of the conductive pins 3 corresponds to the position of the recessed portion 13 of the battery case 11 when the battery case 11 is mounted on the mounting portion 1a. When the conductive pins 3 project, they are inserted in the recessed portion 13. At this time, the distal ends of the conductive pins 3 respectively come into contact with the terminal plates 14 arranged in the recessed portion 13, as shown in FIG. 7 to be described later.

The diameter of the distal end portion of each conductive pin 3 is preferably close to the diameter of the recessed portion 13 so that the conductive pins 3 and the recessed portion 13 engage well with each other. A small gap may be preferably provided between the distal end portions of the conductive pins 3 and the recessed portion 13. This gap prevents the distal ends of the recessed portion 13 from not reaching the terminal plates 14 or the slider 4 from not sliding due to the contact friction between the distal end portions of the conductive pins 3 and the recessed portion 13.

The conductive pins 3 are electrically connected to the internal circuit of the telephone body 1 through lead wires 5. Power is supplied from the battery case 11 through the conductive pins 3. In this case, the lead wires 5 may be connected to the conductive pins 3 directly. Alternatively, electrode surfaces connected to the internal circuit may be provided on the upper surface of the guide plate 9, and the conductive pins 3 may be brought into slidable contact with the electrode surfaces.

Reference numeral 8 denotes a release button. When the release button 8 is depressed, the slider 4 moves backward against the force of the spring to retract the conductive pins 3 into the slit 1c. A projection 8a at the upper portion of the release button 8 projects from an opening 1d of the portable telephone body 1 so that the release button 8 can be depressed. The release button 8 is supported as two inclined segments 8b at its lower portion are stored in inclined grooves 4a formed in the slider 4.

More specifically, the inclined surfaces of the inclined segments 8b and the inclined surfaces of the inclined grooves 4a are in contact with each other, as shown in FIG. 5C. When the release button 8 is depressed, the slider 4 moves backward along the guide plate 9. Upon depression of the release button 8 to retract the conductive pins 3, during mounting of the battery case 11, the battery case 11 is allowed to enter the mounting portion 1a, and during removal of the battery case 11, the conductive pins 3 are disengaged from the recessed portion 13 of the battery case 11 so that the battery case 11 can be removed.

Figure 6:
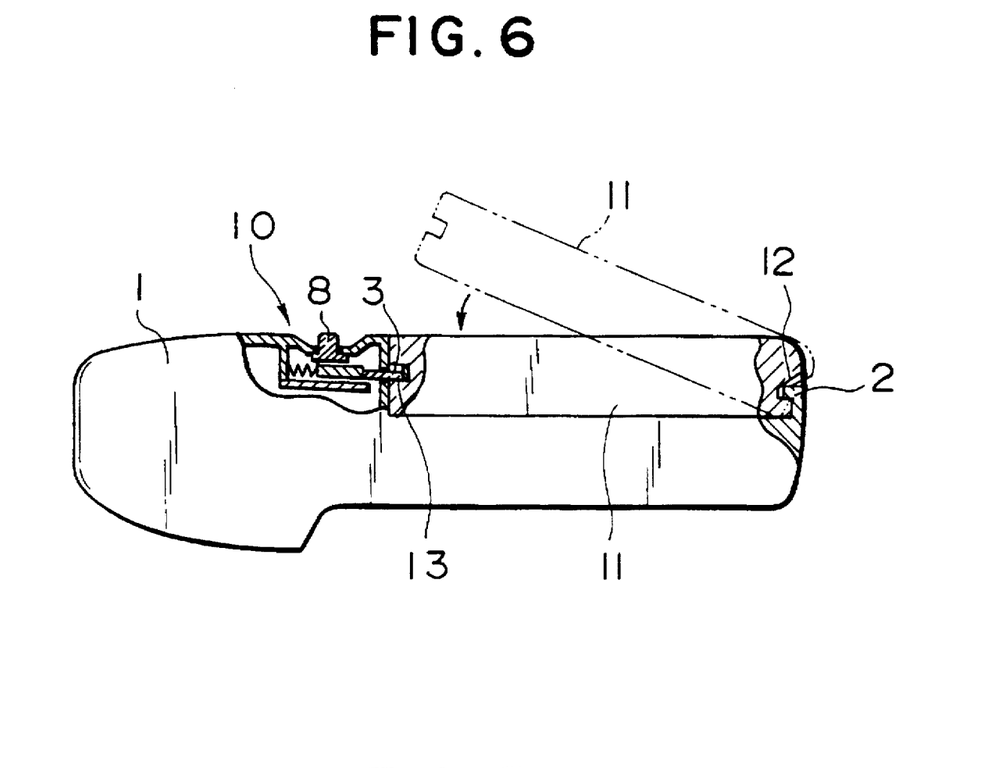
FIG. 6 is a partially cutaway side view of the main body of the portable cellular phone set of the present invention.

FIGS. 6 and 7 show a state wherein the battery case 11 is mounted on the telephone body 1, in which FIG. 6 is a partially cutaway side view of the main body of the portable cellular phone set, and FIG. 7 is an enlarged sectional view of the main part of FIG. 6.

Referring to FIGS. 6 and 7, the battery case 11 is mounted on the mounting portion 1a of the telephone body 1 in accordance with the following procedure.

The release button 8 of the telephone body 1 is depressed to retract the conductive pins 3 into the slit 1c. In this state, the locking groove 12 at the lower portion of the battery case 11 is engaged with the locking segment 2 of the telephone body 1 (see an alternate long and two short dashed line in FIG. 6). While the release button 8 is kept depressed, the upper portion of the battery case 11 is pivoted to the telephone body 1 side and located on the mounting portion 1a, and the release button 8 is released. The slider 4 is slid forward by the spring 7 along guide plate 9' so that the conductive pins 3 are inserted into the recessed portion 13 of the battery case 11 to engage with the recessed portion 13. At this time, the distal ends of the conductive pins 3 are respectively in contact with the terminal plates 14 in the recessed portion 13. Accordingly, the battery case 11 can be fixed, and simultaneously power can be supplied from the battery in the battery case 11 to the internal circuit of the portable cellular phone set.

Another arrangement is also possible in which terminal plates 14 of a battery case 11 are placed not on the bottom portion of a recessed portion 13 but on the side surface of the recessed portion 13, so that the terminal plates 14 are brought into slidable contact with the side surfaces of the conductive pins 3. In the above embodiment, the electrode portions of the telephone body 1 are formed as conductive pins. However, the distal end portion of the slider 4 may project or retract through the slit 1c to engage with or disengage from the recessed portion 13. Terminal plates may be provided on the end of the distal end portion of the ejectable/retractable slider 4, and these terminal plate may be brought into contact with the terminal plates 14 in the recessed portion 13.

A case will be described wherein the mounting structure of the battery case of the present invention is applied to the additional battery of a cassette tape player set.

Figure 8:
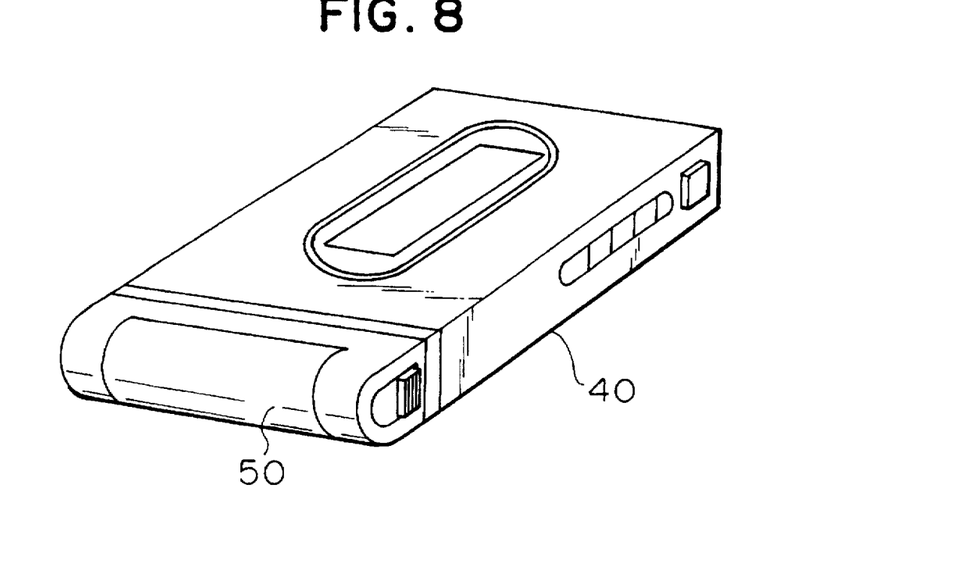
FIG. 8 is a perspective view showing a state of the second embodiment of the present invention wherein the electronic equipment is a cassette tape player and an additional battery case is mounted on the cassette tape player.
Figure 9A:
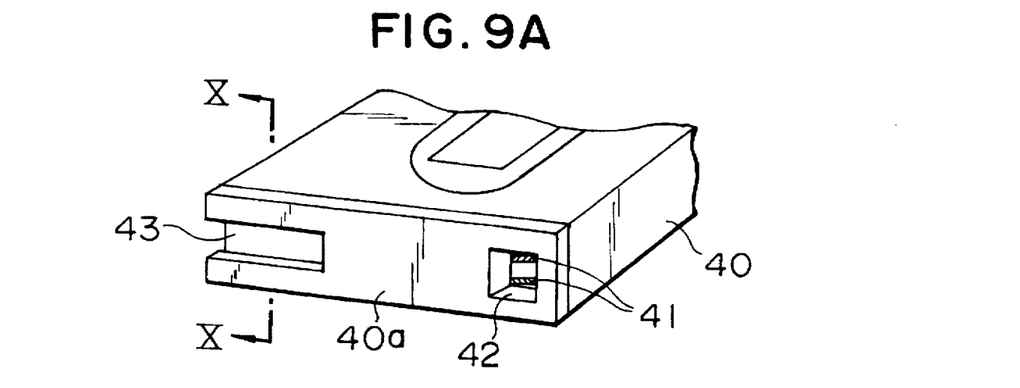
FIG. 9A is a perspective view of the main part of the cassette tape player from which the additional battery case is removed.
Figure 9B:
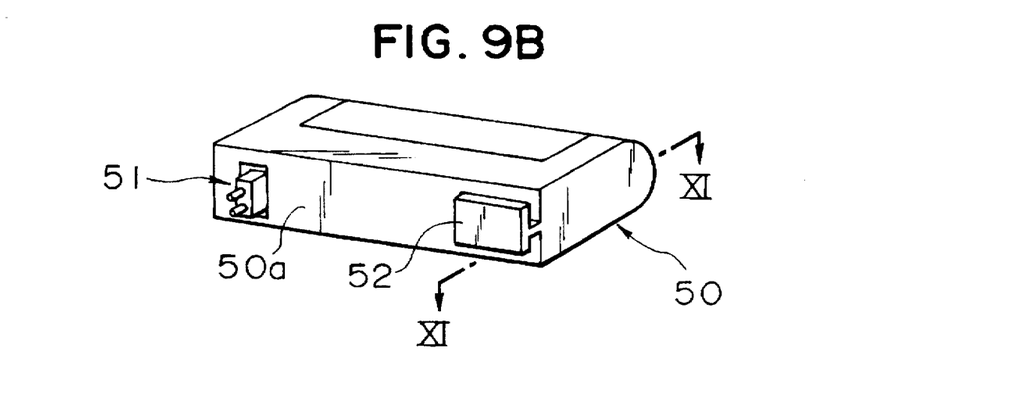
FIG. 9B is a perspective view of the additional battery case.
Figure 10:
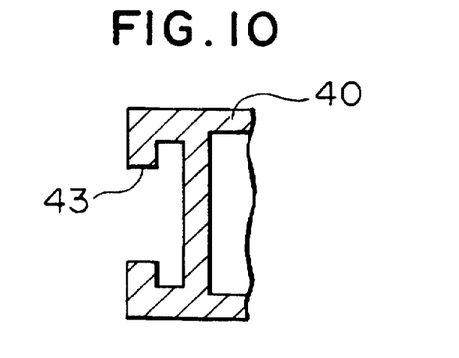
FIG. 10 is a partial sectional view of a vertical plane taken along the line X—X of FIG. 9A.
Figure 11:
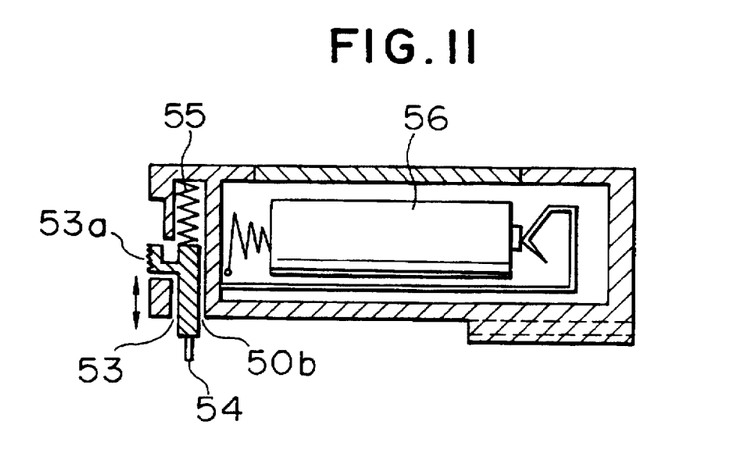
FIG. 11 is a sectional view of a horizontal plane taken along the line XI—XI of FIG. 9B.

FIGS. 8 to 11 show this embodiment, in which FIG. 8 is a perspective view showing a state wherein a battery case 50 is mounted on a cassette tape player set 40, FIGS. 9A and 9B are a perspective view (FIG. 9A) of the cassette tape player set 40 from which the battery case 50 is removed and a perspective view (FIG. 9B) of the removed battery case 50, FIG. 10 is a partial sectional view of a vertical plane taken along the line X—X of FIG. 9A, and FIG. 11 is a sectional view of a horizontal plane taken along the line XI—XI of FIG. 9B.

In this embodiment, different from the above embodiment, a recessed portion 42 having two electrode plates 41 is formed in a battery case mounting portion 40a of the cassette tape player set 40, and a lock mechanism 51 is provided to the battery case 50. The two electrode plates 41 are connected to the internal circuit of the cassette tape player set 40. The cassette tape player set 40 and the battery case 50 are integrated by slidably engaging a locking groove 43 and a locking segment 52 respectively provided to them, and are fixed to each other by engaging the lock mechanism 51 with the recessed portion 42.

The battery case 50 has a dry cell 56 in it. When the cassette tape player set 40 is to be used for a long period of time, the battery case 50 is added to a rechargeable battery incorporated in the cassette tape player set 40. As shown in FIG. 11, the lock mechanism 51 provided to the battery case 50 has a slidable slider 53 in its guide groove 50b formed in a mounting surface 50a which is to be mounted on the cassette tape player set 40. The slider 53 has two conductive pins 54 at its distal end. The slider 53 is constantly biased by a spring 55 at the bottom portion of the guide groove 50b so that its distal end portion and conductive pins 54 project from the mounting surface 50a.

The slider 53 integrally has an operating portion 53a, exposing to the side surface of the battery case 50, on its side surface. When the operating portion 53a is operated to slide the slider 53 against the force of the spring 55, the conductive pins 54 can be retracted into the guide groove 50b. The conductive pins 54 are respectively connected to the electrodes of the dry cell in the battery case 50.

While the conductive pins 54 are retracted, the battery case 50 is moved to engage its locking segment 52 with the locking groove 43 of the cassette tape player set 40 from a side portion of the battery case mounting portion 40a. When the lock mechanism 51 reaches the recessed portion 42, the operating portion 53a of the slider 53 is released. The slider 53 moves its distal end portion forward into the recessed portion 42 with the spring 55 to fit in the recessed portion 42. Simultaneously, the conductive pins 54 at the distal end of the slider 53 come into contact with the electrode plates 41. This realizes fixing of the battery case 50 and enables power supply from the dry cell 56 in the battery case 50.

A lock mechanism is not provided to the cassette tape player set 40 due to the following reason. Sometimes the battery case 50 is not used. In this case, if a lock mechanism is not provided to the cassette tape player set 40, a projection formed by the lock mechanism will not appear on the cassette tape player set 40.

A case will be described wherein the mounting structure of the battery case of the present invention is applied to a laptop (notebook) computer set (to be referred to as a notebook personal computer set hereinafter).

Figure 12:
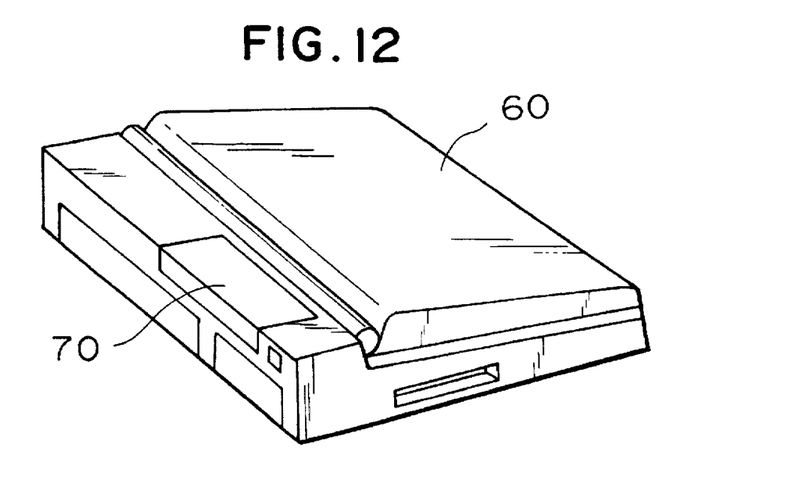
FIG. 12 is a perspective view showing a state of the third embodiment of the present invention wherein the electronic equipment is a laptop computer (notebook personal computer) and a battery case is mounted on the notebook personal computer.
Figure 13A:
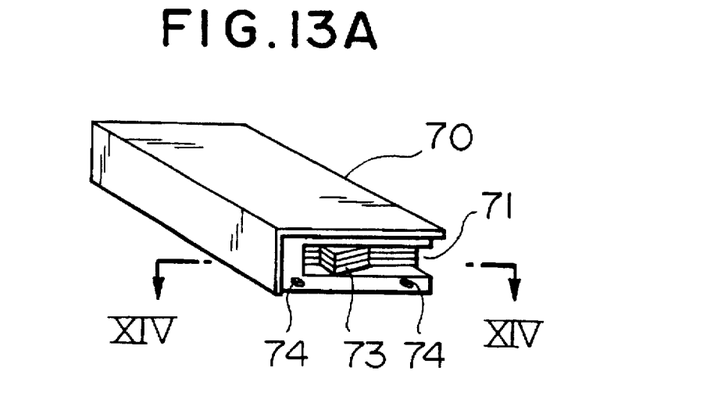
FIG. 13A is a perspective view of the battery case and FIG. 13B is an enlarged perspective view of an the terminals of the battery case.
Figure 13B:
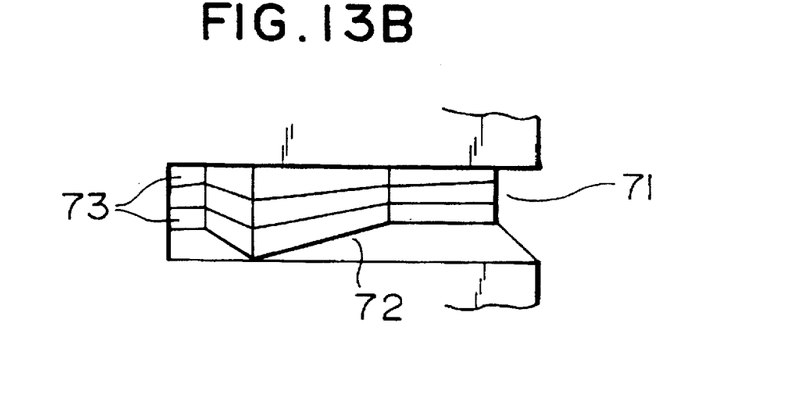
Figure 14:
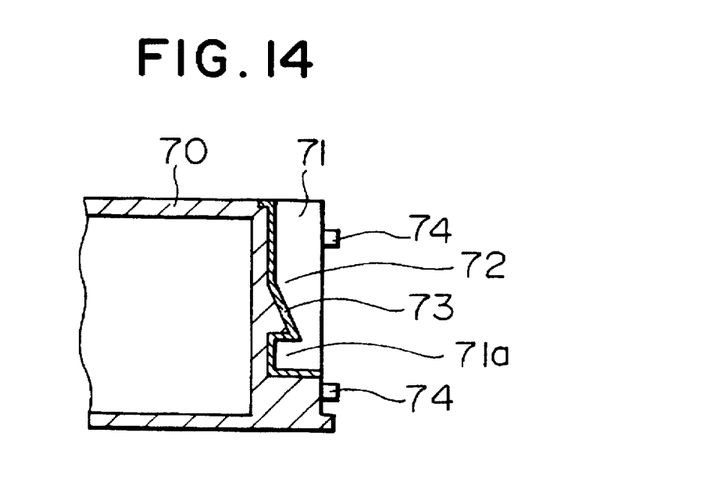
FIG. 14 is a partial sectional view of a horizontal plane taken along the line XIV—XIV of FIG. 13A.
Figure 15:
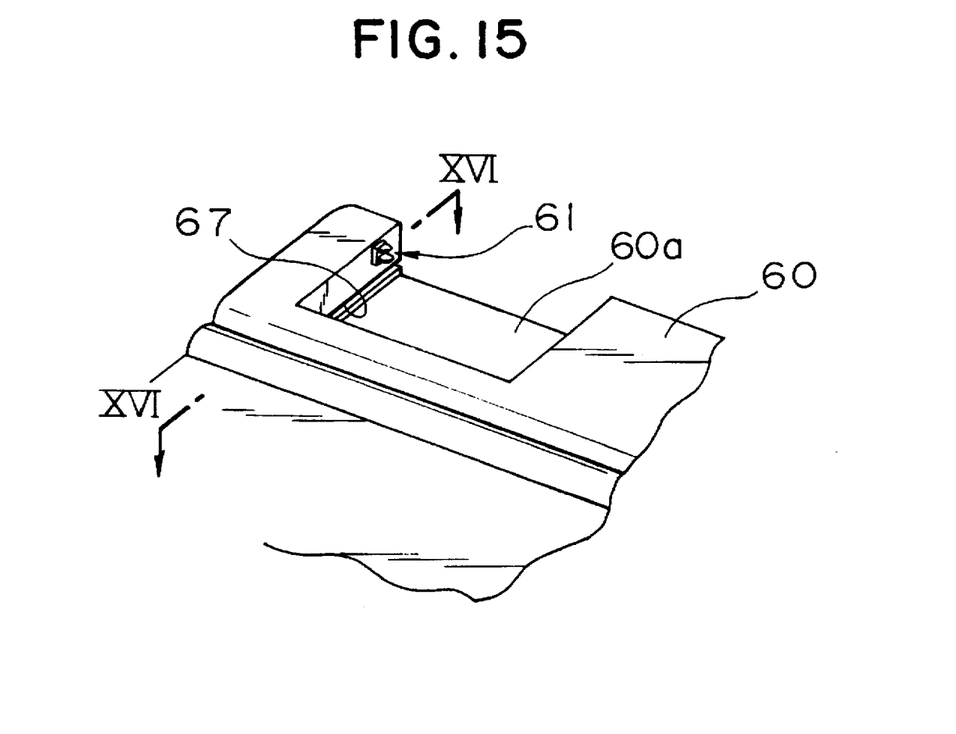
FIG. 15 is a perspective view showing a battery case mounting portion according to the third embodiment.
Figure 16:
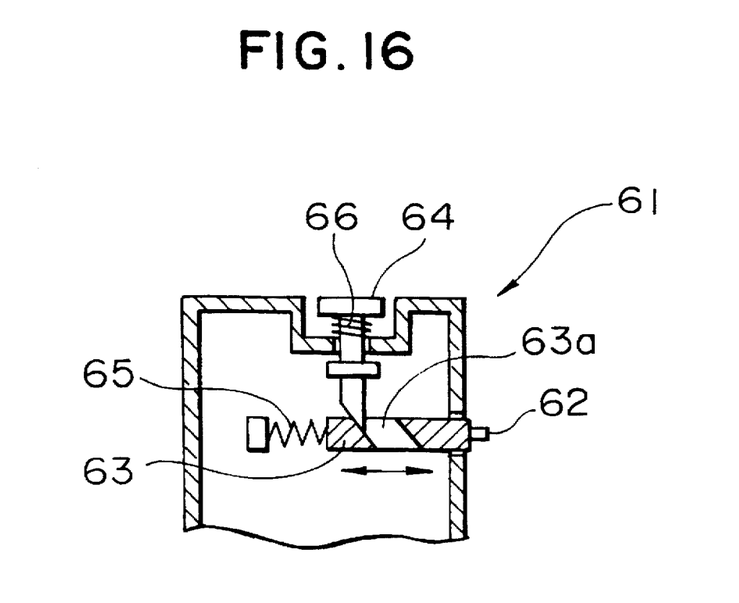
FIG. 16 is a partial sectional view of a horizontal plane taken along the line XVI—XVI of FIG. 15.

FIGS. 12 to 16 show this embodiment, in which FIG. 12 is a perspective view showing a state wherein the battery case is mounted on the notebook personal computer set, FIG. 13A is a perspective view of the battery case, FIG. 13B is an enlarged view of the terminal plates of the battery case, FIG. 14 is a partial sectional view of a horizontal plane taken along the line XIV—XIV of FIG. 13A, FIG. 15 is a perspective view showing the battery case mounting portion on the notebook personal computer set, and FIG. 16 is a partial sectional view of a horizontal plane taken along the line XVI—XVI of FIG. 15.

In this embodiment, a recessed portion 71 is formed in a battery case 70, and a lock mechanism 61 to engage with the recessed portion 71 is formed in the notebook personal computer set 60, in the same manner as in the first embodiment. The battery case 70 is slidably inserted in a mounting recessed portion 60a formed in the notebook personal computer set 60 from the rear side and is fixed by the lock mechanism 61. When inserting the battery case 70, projecting locking segments 74 and a locking groove 67 engage with each other to regulate the inserting direction of the battery case 70 and to prevent the battery case 70 from coming out upward.

As shown in FIGS. 13A, 13B, and 14, the recessed portion 71 is formed in a side surface of the battery case 70, and an introduction path 72 is formed on this side surface to be inclined from the upstream side of the insertion direction of the battery case 70 so as to be continuous with the recessed portion 71. Two terminal plates 73 electrically isolated from each other are provided to extend from the introduction path 72 to the recessed portion 71. The terminal plates 73 are connected to the electrodes of the internal battery.

As shown in FIGS. 15 and 16, the lock mechanism 61 of the notebook personal computer set 60 is provided to a side surface of the mounting recessed portion 60a. The lock mechanism 61 controls, with a release button 64, projection and retraction of a slider 63 having two conductive pins 62 connected to the internal circuit at its distal end portion. The slider 63 is guided to be movable only in directions of a double-headed arrow in FIG. 16 and is constantly biased by a spring 65 in a forward direction, in the same manner as in the above embodiments.

The distal end portion of the release button 64 is formed inclined and comes into contact with the inclined surface of an inclined hole 63a of the slider 63. When the release button 64 is depressed, it moves the slider 63 backward.

The spring 66 helps to return the release button 64.

When mounting the battery case 70 on the notebook personal computer set 60, the release button 64 is not depressed, the locking segments 74 of the battery case 70 are engaged with the locking groove 67 of the notebook personal computer set 60, and the battery case 70 is inserted along the mounting recessed portion 60a from the rear side. As the battery case 70 is being inserted, the distal ends of the conductive pins 62 at the distal end of the slider 63 come into contact with the terminal plates 73 on the inclined surface of the introduction path 72 of the battery case 70.

When the battery case 70 is further inserted, the conductive pins 62 slide on the terminal plates 73 while they are urged backward by the inclined surface of the introduction path 72. At the same time, the slider 63 moves backward little by little against the force of the spring 65, thereby promoting insertion of the battery case 70. While the conductive pins 62 slide on the terminal plates 73, materials on the distal end portions of the conductive pins 62, e.g., oil films or dust, which adversely affect the conductivity are moved.

When the conductive pins 62 move over the inclined surface to reach a deep recessed portion 71a, the spring 65 is restored to move the slider 63 forward, so that the distal ends of the conductive pins 62 are brought into contact with the terminal plates 73 in the deep recessed portion 71a, thereby enabling power supply from the battery. At the same time, the distal end portion of the slider 63 engages with the deep recessed portion 71a to lock the battery case 70.

What is claimed is:

1. A battery case mounting structure for electronic equipment comprising:

a battery case having a battery for supplying power to said electronic equipment;

said electronic equipment having a main body provided with a mounting portion on which said battery case is to be mounted;

a recessed portion formed in said battery case;

a locking projecting body formed on said main body of said electronic equipment and inserted in said recessed portion of said battery case to fix said battery case to said mounting portion;

a guide portion for supporting said locking projecting body to be projectable from or retractable into said recessed portion so that said battery case is attachable to or detachable from said main body of said electronic equipment;

a spring mechanism for constantly biasing said locking projecting body to project;

an operating portion for sliding said locking projecting body to retract against a biasing force of said spring mechanism;

two terminals formed in said recessed portion of said battery case to be electrically connected to electrodes of said battery; and two terminals formed on said locking projecting body to come into electrical contact with said terminals formed in said battery case respectively and to be electrically connected to an operating circuit of said electronic equipment when said locking projecting body is inserted in said recessed portion of said battery case.

2. A battery case mounting structure for electronic equipment comprising:

a battery case having a battery for supplying power to said electronic equipment;

said electronic equipment having a main body provided with a mounting portion on which said battery case is to be mounted;

a recessed portion formed in said main body of said electronic equipment;

a locking projecting body formed on said battery case and inserted in said recessed portion of said main body of said electronic equipment to fix said battery case to said mounting portion;

a guide portion for supporting said locking projecting body to be projectable from or retractable into said recessed portion so that said battery case is attachable to or detachable from said main body of said electronic equipment;

a spring mechanism for constantly biasing said locking projecting body to project;

an operating portion for sliding said locking projecting body to retract against a biasing force of said spring mechanism;

two terminals formed in said recessed portion of said main body of said electronic equipment to be electrically connected to an operating circuit of said electronic equipment; and two terminals formed on said locking projecting body to come into electrical contact with said terminals formed in said main body respectively and to be electrically connected to electrodes of said battery when said locking projecting body is inserted in said recessed portion of said main body of said electronic equipment.

3. A structure according to claim 1, wherein said mounting portion of said main body of said electronic equipment is formed with an engaging segment or an engaging groove, said battery case is formed with an engaging groove or an engaging segment, said engaging segment or engaging groove formed on or in said main body of said electronic equipment engages with said engaging groove or engaging segment formed in or on said battery case, and said battery case is fixed to said mounting portion through engagement of said engaging groove and said engaging segment and engagement of said recessed portion and said locking projecting body.

4. A structure according to claim 2, wherein said mounting portion of said main body of said electronic equipment is formed with an engaging segment or an engaging groove, said battery case is formed with an engaging groove or an engaging segment, said engaging segment or engaging groove formed on or in said main body of said electronic equipment engages with said engaging groove or engaging segment formed in or on said battery case, and said battery case is fixed to said mounting portion through engagement of said engaging groove and said engaging segment and engagement of said recessed portion and said locking projecting body.

5. A structure according to claim 1, wherein said two terminals formed in said recessed portion of said battery case form flat plates provided side by side on a bottom portion of said recessed portion, and said two terminals formed on said locking projecting body of said mounting portion of said main body of said electronic equipment comprise two conductive projecting pins to form distal end portions of said locking projecting body.

6. A structure according to claim 2, wherein said two terminals formed in said recessed portion of said main body of said electronic equipment form flat plates provided side by side on a bottom portion of said recessed portion, and said two terminals formed on said locking projecting body of said battery case comprise two conductive projecting pins to form distal end portions of said locking projecting body.

* * * * *